(12) United States Patent
Brogårdh

(10) Patent No.: US 6,412,363 B1
(45) Date of Patent: Jul. 2, 2002

(54) DEVICE FOR RELATIVE MOVEMENT OF TWO ELEMENTS

(75) Inventor: Torgny Brogårdh, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/674,151
(22) PCT Filed: Apr. 29, 1999
(86) PCT No.: PCT/SE99/00705
§ 371 (c)(1),
(2), (4) Date: Dec. 4, 2000
(87) PCT Pub. No.: WO99/58301
PCT Pub. Date: Nov. 18, 1999

(30) Foreign Application Priority Data

Apr. 29, 1998 (SE) .................................................. 9801518

(51) Int. Cl.[7] ............................. B25J 17/00; B25J 18/00
(52) U.S. Cl. ................................ 74/490.05; 74/490.03; 414/744.5; 414/917; 901/15
(58) Field of Search .......................... 74/490.05, 490.03; 414/744.5, 917; 901/15

(56) References Cited

U.S. PATENT DOCUMENTS

| 4,329,110 A | * | 5/1982 | Schmid ........................ 414/730 |
| 4,341,502 A | * | 7/1982 | Makino .................... 414/744.1 |
| 4,522,555 A | * | 6/1985 | Inoue et al. ................. 414/733 |
| 4,976,582 A | | 12/1990 | Clavel |
| 5,156,062 A | | 10/1992 | Appleberry |

OTHER PUBLICATIONS

Derwent abstract, No. 92–338779/41, week 9241 Abstract of SU, 1691092 (Odess Precision Tools Des Bur), Nov. 15, 1991.
Derwent abstract, No. 90–20983/03, week 9003 Abstract of SU, 1472252 (Azerb Poly), Apr. 15, 1989.

* cited by examiner

Primary Examiner—Allan D. Herrmann
(74) Attorney, Agent, or Firm—Dykema Gossett PLLC

(57) ABSTRACT

A device for relative movement of two elements (1, 2) comprises three link arrangements (A, B, C) and drives (3, 4, 5) for these arrangements. The link arrangements have forearm and upper arm components hinged to the upper arm components and to the second element respectively.

18 Claims, 2 Drawing Sheets

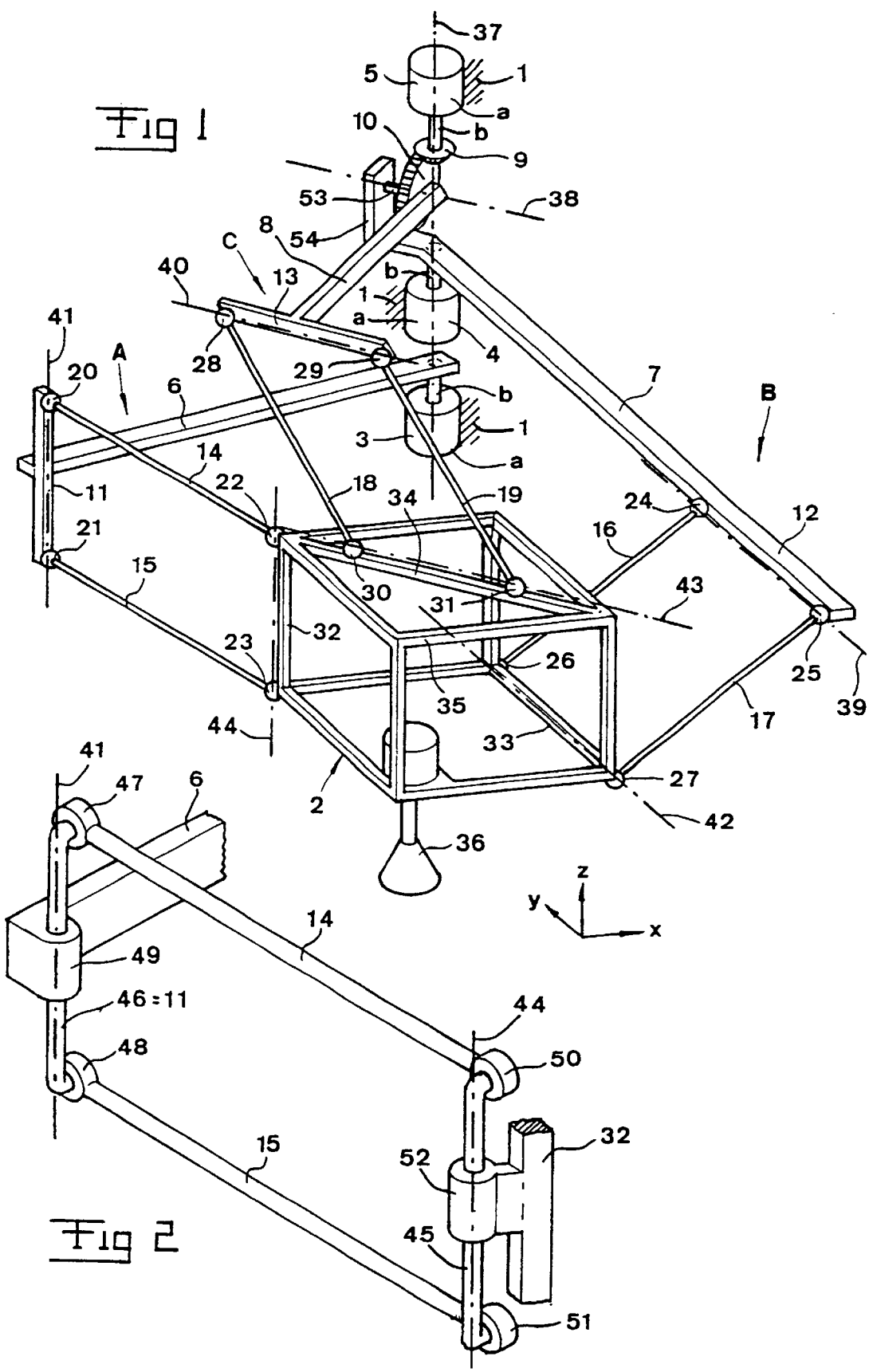

DEVICE FOR RELATIVE MOVEMENT OF TWO ELEMENTS

FIELD OF THE INVENTION AND PRIOR ART

This invention is related to a device according to the precharacterising part of enclosed claim 1. In its preferred embodiment, the device forms a robot, the second element of which is adapted to carry, directly or indirectly, a working member. This working member may serve for arbitrary movement, processing, working etc. of objects.

For moving and rotating objects without changing the inclination of the objects robots of the so called SCARA type are primarily used today. These robots are manufactured for the. four degrees of freedom x, y, z and $\phi_z$ (rotation of the object about an axis parallel to the z-axis). For manipulating the object in the xy-plane, two arms coupled in series are used, said arms working in the xy-plane, the axes thus being perpendicular to the xy-plane. In order to achieve movement in z-direction a linear movement device is used. This device may be present either after the arms coupled in series or before the arms coupled in series. In the first case the arms coupled in series must move the drive assembly for the z-movement and in the latter case the drive assembly for the z-movement must move the arms coupled in series. The drive assembly for the $\phi_z$-movement will always be located at the extreme end of the kinematic chain of the robot.

In applications where lighter objects are to be moved with requirement of very short movement times, SCARA robots, as well as all other robots having kinematic links coupled in series, present the disadvantage that performance is restricted by the moving mass of the robot itself. This makes SCARA robots to obtain a lower limit as to the cycle time for e.g. an application where objects are to be continuously picked and placed. This cycle time as short as possible is determined primarily by the thermal load of the motors. In order to reduce the cycle time, a larger motor torque and, accordingly, larger motors are required which results in a larger moving mass of the robot. This means in its turn requirements for more rigid arm systems, which resuits in an even larger moving mass etc. A forced motor cooling may of course be used, transmissions be introduced to displace the motors more closely to the base of the robot etc. but this simultaneously makes the robot more expensive and less robust.

A possibility to drastically reduce the moving mass of a robot is to use a parallel robot structure. A study of which arm structures are possible for parallel robots is made in the article "Structural kinematics of in-parallel-actuated robot-arms" of Prof. K. H. Hunt (Journal of mechanisms, transmissions and automation in design, December 1983). Of particular interest is an arm structure consisting of three parallel link arrangements, where each link has five joints, four joints of which form two joint pairs of cardan type. This link type is described in detail in the article "Constantvelocity shaft couplings: a general theory" of Prof. K. H. Hunt (Journal of engineering for industry, May 1973). An implementation of a robot using the kinematics structure described by Prof. Hunt is shown in U.S. Pat. No. 4,976,582. For movement of objects in x-, y- and z-direction, three force applying arrangements are used in the form of drive means, which are located in a triangularly shaped pattern on a first element in the form of a stationary platform and which are connected to a movable element in the form of a further platform, on which the working member, e.g. a gripping means, is mounted via a link arrangement of their own having five joints. One of these joints is realised by rotatability. of an output axle from the drive means whereas the four other joints are implemented as either two cardan joints, which in an embodiment with two mutually hingedly connected arm components of the link arrangement connect one of these arm components with the remaining arm component and with the second element respectively, or as four cardan couplings or four spherical joints in case one of the arm components in the link arrangement comprises two links arranged in parallel. To rotate the object, a transmission between a drive means on the stationary first element and a rotation device on the movable second element is used. This transmission must provide five degrees of freedom, which more specifically are realised in the form of a translation coupling and two cardan joints.

Since all drive means are mounted on the stationary first element, the parallel robot structure will have a considerably smaller movable mass than a SCARA robot. This makes it possible to achieve much shorter cycle times at the same available drive means torque. However, the parallel arm robots suggested by Prof. Hunt and described in the U.S. Pat. No. 4,976,582 have several disadvantages relative to SCARA robots:

1. The working range is small relative to the volume required by the arm structure of the robot.
2. The robot cannot turn around to serve several working surfaces in the surroundings of the robot.
3. To work above a working surface, the stationary first element of the robot must be suspended in a frame. This causes several problems:
   3.1 Additional costs for the frame
   3.2 The frame makes it more difficult to reach the working area of the robot.
   3.3 The frame has a mechanical natural frequency which is excited by the robot and which causes lack of accuracy when positioning the objects moved by the robot.
   3.4 Oil from bearings and gear boxes and dirt collected on the first stationary element of the robot will fall straight down into the working area of the robot.
   3.5 The robot is more difficult to reach for repair and service.
   3.6 A longer cable assembly is required, both for robot connection and gripping means connection and possibly for forced motor cooling.

Thus, a parallel robot structure, which does not have all the above disadvantages relative to a SCARA robot, would be desirable. This means that one would require a parallel arm robot with SCARA kinematics. Such a robot kinematics is described in the European patent EP 0 668 130 B1. The movable element is there formed as a platform and moved by means of two arms having five joints and one arm with three joints. The arms with five joints work in the xy-plane and use an arrangement with parallel lines to obtain a constant inclination of the movable platform. The arm with joints works in the xz-plane and contributes to locking of all degrees of freedom of the movable platform. However, this SCARA-similar robot structure has the following disadvantages compared to the parallel robot structure in the U.S. Pat. No. 4,976,582:

1. The arms most closely to the movable platform must transfer torque from the movable platform to the stationary platform. This means that bearings and arms must be dimensioned accordingly, which results in a larger moving mass than in the case where three pairs of parallel links, which only have to absorb normal forces, are used.

2. The motor manipulating the arm with three joints must be turned around and this results in an extra moving mass of the robot.
3. The arrangement with parallel lines to obtain a constant inclination of the moving platform has a shorter life and less accuracy than parallel links. Besides the lines and their attachments will gather dirt and make it impossible to use the robot in applications having requirements with regard to hygiene.

A parallel robot with a SCARA-similar kinematics but not presenting the disadvantages mentioned above is described in the Swedish patent 9700090-5. Three drive means are there mounted with coinciding rotation centra and each drive means is connected to the movable element (platform) via arms having five degrees of freedom. The arms most closely to the movable platform consist of three, two and one link respectively and these links only have to transfer normal tensions between the movable and stationary elements (platforms). This makes the arm system very light and at the same time very rigid. Besides, the joints are only subjected to a normal force and the bearings may therefore be made small with a resulting small moving mass of the robot. All drive means are mounted on the stationary element (platform) (FIG. 10) and since they have a common axis centre, the whole robot may be turned around by synchronous control of the drive means.

A disadvantage with the robot structure according to the Swedish patent 9700090-5 is that one of the arms has three links between the movable element (platform) and an arm part mounted on an output axle of the drive means and that another arm only hat one link. This results in the links for these arms not being possible to be mounted in pairs, which otherwise is an advantage, both from the point of view of force transfer and with regard to bearing design. One could, of course, introduce redundant links so that the arm with three links obtains two link pairs. and the arm with one link obtains one link pair, but this results in a larger moving mass and increases the costs for the robot.

SUMMARY OF THE INVENTION

Object of the Invention

The present invention has for its object to reduce the above discussed problems of the parallel robot structure in the Swedish patent 9700090-5.

Presentation of the Invention

The object stated is according to the invention achieved by providing the device with the features appearing from the enclosed claims, and then primarily claim 1. A robot is thereby obtained with link arrangements operating in parallel, said robot being well suited for floor mounting, and presenting, in addition, SCARA-kinematics and having a minimum of movable mass. This robot provides great possibilities for picking and placing objects to a low cost and with very short movement times. Examples of applications are sorting and packaging of cakes and pralines, handling of small packages, cans and bottles and packages of tablets and tablet charts within the pharmaceutical industry.

Advantageous developments of the basic concept of the invention are defined in the dependent claims 2–19.

Further advantages and features of the invention appear from the enclosed description.

BRIEF DESCRIPTION OF THE DRAWINGS

With reference to the enclosed drawings, a more specified description of embodiment examples of the invention will follow hereafter.

In the drawings:

FIG. 1 is a diagrammatical perspective view illustrating an embodiment of the invention;

FIG. 2 is a detailed view illustrating a design forming an alternative to the one shown in FIG. 1.

DETAILED DESCRIPTION OF PREFERRED EMBODIMENTS

Figure 3:
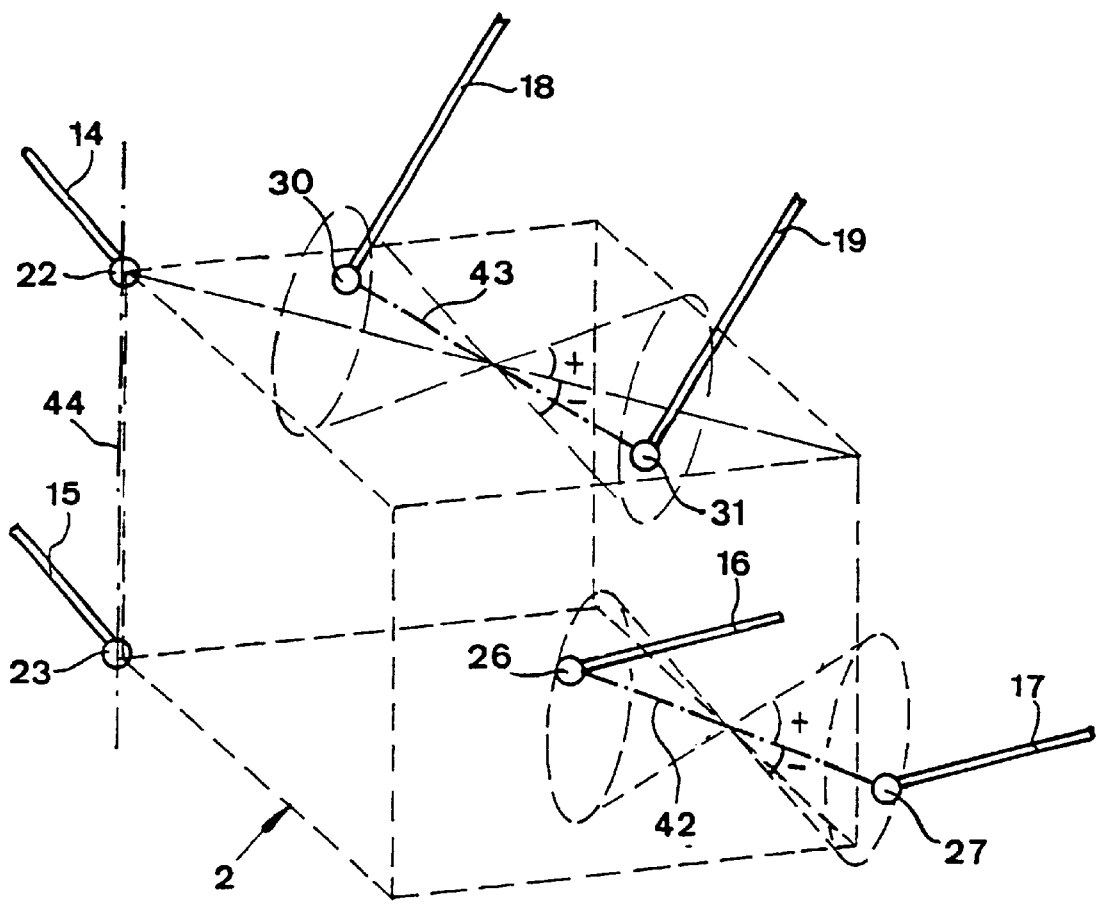
FIG. 3 is a perspective view illustrating certain possibilities of variations as far as the connection of the link arrangements of the robot to the movable second element is concerned.

FIG. 1 illustrates an embodiment of the invention. A first element 1 is in the example conceived to be stationarily or rigidly mounted, e.g. to a stand secured to the floor and symbolised at 1. However, it is pointed out in this connection that the element 1 here described as "stationary" in itself may be movable in space by means of another movement equipment. A second element movable relative to the element 1 is denoted 2. This element has in the example the character of a frame. The element 2 is manipulatable in x-, y- and z-direction by means of force applying arrangements 3, 4 and 5. These are realised as drive means comprising a respective stationary portion a and a portion b movable relative thereto. It is preferred that the drive means 3, 4, 5 are shaped as rotation means, i.e. that their movable portions b are rotatable. These drive means 3, 4, 5 have their stationary portions a rigidly connected to the first element 1.

At least three link arrangements A, B, C are coupled between the two elements 1, 2. The drive means 3, 4 and 5 are arranged to cause the link arrangements to move to thereby achieve a relative movement of the elements 1, 2. Each of the link arrangements A, B, C comprises at least one first component 6, 7, 8 and at least one second component 14, 15; 16, 17; 18, 19. The embodiment illustrated in FIG. 1 will now initially be described, each link arrangement A, B, C in said embodiment comprising at least two parallel links, which can be said to form a forearm of each link arrangement. The first component 6, 7, 8 forms an upper arm of the respective link arrangement A, B, C.

The second element 2 is built up as a frame to enable the hinged pairwise mounting in three dimension of the three pairs of parallel links 14, 15; 16, 17; 18, 19. It is decisive for the functioning of the robot with a SCARA-similar kinematics how the three pairs of links are mounted on the frame 2.

The two links 14, 15; 16, 17; 18, 19 in each of the link arrangements A, B, C are hingedly connected to the upper arm component 6, 7 and 8 respectively of the link arrangements and to the frame 2. More specifically, the links 14 and 15 are, by means of joint arrangements 20, 21, connected to the arm component 6 whereas the links are connected to, by means of joint arrangements 22, 23, to the frame 2. These joint arrangements are designed so that they allow, in the assembled state of the robot, a relative movement with two and not more than two degrees of freedom between the forearm component formed by the links 14, 15 and the upper arm component 6 and the frame 2 respectively, said degrees of freedom consisting in pivotability in all directions about two real or imaginary axes placed at an angle to each other. In practise the individual joints 20, 21, 22, 23 may be formed by cardan joints or ball joints. In the latter case one degree of freedom in the form of rotatability of the individual link 14, 15 about its longitudinal axis will be added, but as a consequence of the links 14, 15 arranged in parallel this additional degree of freedom does not involve any additional degree of freedom of the frame 2 relative to the stand or element 1 when the robot is in its assembled state.

What has just been described with regard to the links 14 and 15 and their joints in the link arrangement A has also its correspondence with respect to the other link arrangements B and C. More specifically, the forearm component of the link arrangement B comprises likewise two links 16, 17 arranged in parallel, said links being connected, via joints 24, 25, to the upper arm component 7 and, via joints 26, 27, to the frame 2. With respect to the link arrangement C, the forearm component is formed by the two parallel links 18, 19, which are connected, via joints 28, 29, to the upper arm component 8 and, via joints 30, 31, to the frame 2.

The two links in each of the link pairs in the link arrangements A, B, C have substantially equal length, which means that they as a consequence of the parallelism form parallelograms. A working member 36 of arbitrary nature, e.g. a gripping means, is provided on the frame 2.

The drive means 3 has its movable portion b connected to the upper arm component 6 so that the latter is imparted pivotability about the axis denoted 37.

The drive means 4 has its movable portion b connected to the upper arm component 7 of the link arrangement B so that the drive means 4 may impart the upper arm component 7 a pivoting movement. This pivoting movement occurs about the axis 37. It is pointed out that the two drive means 3 and 4 do not necessary have to have their axes of rotation parallel and even less coinciding as is illustrated in FIG. 1 although this mostly is preferred, not the least since the kinematics then is simplified for turning around the robot with a large angle and more specifically up to a complete turn.

Also the remaining C of the link arrangements has its upper arm component 8 pivotably arranged, more specifically about an axis denoted 38. This axis 38 is non-parallel to the pivoting axis 37 for at least one of the upper arm components 6, 7 belonging to the two other link arrangements A, B. For pivoting the upper arm component 8 there is the drive means 5, the movable portion b of which comprises a gear wheel 9 contained in an angular gear 9/10. The conical gear wheel 10 is rigidly connected to the upper arm component 8 so that rotation of the gear wheel 10 gives rise to pivoting of the upper arm component 8 about the axis 38. The gear wheel 10 is rotatably supported in the upper arm component 7 of the link arrangement B by means of an axis 53. This arrangement means that on pivoting of the upper arm component 7 by means of the drive means 4 also the arm component 8 will accompany as a consequence of the fact that the axis 53 and also the gear wheel 10 will accompany the pivoting movement.

It is preferred that the axis of rotation of the movable portion b of the drive means 5 coincides with the axis of rotation of b of the drive means 4. The mostly optimal embodiment in this regard is that the movable portions of all drive means 3, 4, 5 have their movable portions rotatable about one and the same geometrical axis 37.

Decisive for the robot to function with a SCARA-similar kinematics is how the three pairs of links 14, 15; 16, 17; 18, 19 are mounted on the frame 2. According to the invention there are requirements with regard to the directions of the lines 42, 43 and 44. These lines are defined by pivoting centra of the joints connecting the forearms to the frame 2. Thus, the line 42 is defined by pivoting centra of the joints 26 and 27, which provide the links 16 and 17 with a hinged connection to the frame 2 in the frame stay 33. In the same manner, the line 43 is defined by the joints 30 and 31, which connect the links 18 and 19 to the frame stay 34 and the line 44 by the joints 22 and 23 between the links 14 and 15 and the frame stay 32.

According to the embodiment in FIG. 1, the lines 42 and 43 are parallel to the xy-plane whereas the line 44 is parallel to the z-axis. Furthermore, the line 43 forms the angle 45° with the line 42. At the same time, the directions of the lines 42, 43 and 44 define the orientation of the frame 2.

Further requirements are present: in FIG. 1 the line 39 is defined by the joints 24 and 25 connecting the links 16 and 17 to the upper arm component 7 of the link arrangement B. The lines 39 and 42 must be mutually parallel.

As to the link arrangement A, the line 41 is defined by the joints 20, 21 connecting the links 14 and 15 to the upper arm component 6. Pivoting centre lines 41 and 44 must, likewise, be mutually parallel. Finally, the line 40 in the link arrangement C is defined by the joints 28, 29 of the links 18, 19. The lines 40 and 43 must be mutually parallel.

To that stated above is to be added that the pivoting axis 37 for the drive means 3 belonging to the link arrangement A must be parallel to the lines 41 and 44. Also for the link arrangement C the pivoting axis 38 for the upper arm component 8 must be parallel to the lines 40 and 43. For the remaining link arrangement B it is required that the pivoting axis 37 for the upper arm component 7 thereof, i.e. the axis of rotation of the movable portion b of the drive means 4 of the link arrangement, is to be perpendicular to lines 39 and 42.

Since the line 43 extends at an angle of 45° relative to the line 42 in the embodiment illustrated, also the lines 38 and 40 will form an angle of 45° to the lines 39 and 42.

The joints 18–31 may be of the type ball joint (spherical bearings) or cardan joint (Hooke-coupling). The use of ball joints is indicated in FIG. 1. It is also possible to distribute the joint function of a pair of links according to FIG. 2, where this arrangement is illustrated for the link pair 14, 15. On the upper arm component 6 there is mounted a bearing 49, which enables the axle 46, which simultaneously functions as the stay 11 in FIG. 1, to be rotated with its centre of rotation coinciding with the line 41. At the two ends of the axle 46 there are mounted two bearings 47, 48 so that the links 14, 15 may be pivoted upwardly/downwardly. In the same way the links are connected to the frame stay 32 via the bearings 50, 51 and 52. The bearing 52 provides the axle 45 with a centre of rotation coinciding with the line 44. It is pointed out that when the forearm component of the respective link arrangement is formed by two parallel links, the respective pivoting centre lines may be considered as being constituted of lines extending through such pivoting centra, which enable the links to pivot in their common plane.

For the rest the following is required in the embodiment according to FIG. 1. The links 14 and 15 should be equal in length and the distance between the joints 20 and 21 should be the same as the distance between the joints 22 and 23 (the distance between the joints is defined as the distance between the pivoting axes of the joints when the parallel links pivot in the plane formed by the links in unison).

The links 16 and 17 should be equal in length and the distance between the joints 24 and 25 should be the same as the distance between the joints 26 and 27. The links 18 and 19 should be equal in length and the distance between the joints 28 and 29 should be equal to the distance between the joints 30 and 31.

As appears from FIG. 1, the upper arm component 7 comprises an angled portion 54, in which the axle 53 of the gear wheel 10 is journaled.

As already appears above, the rotation centre axes for the drive means 4 and 5 must always coincide. On the contrary, it is not necessary that the rotation centre axis for the drive means 3 coincides with the common rotation centre axis for the drive means 4 and 5.

With the embodiment according to FIG. 1, the drive means 3, 4 and 5 will control the position of the frame 2 in x-, y- and z-direction. This means that the robot may be used for e.g. picking and delivering objects with the working member 36 in the figure. The displacements of the working member will occur with a constant inclination ($\phi_x$ and $\phi_y$ constant) whereas the orientation ($\phi_z$) will depend on the direction of the arm component 7. In many applications it is, however, desired to be able to control the orientation of the object, which means that a transmission for rotation of the working member 36 must be introduced, unless it is acceptable to increase the moving mass of the robot by placing a motor for $\phi_z$-manipulation in the frame 2.

As has been mentioned previously, the directions of the lines 42, 43 and 44 are decisive for the operation of the robot. If it is desired that the axis of rotation of the drive means 3 and 4 should be vertical so that the robot easily could be rotated around these axes as a SCARA robot, then the lines 41 and 44 must be vertical.

Since the upper arm component 8 of the link arrangement C is movable relative to the upper arm component 7 of the link arrangement B and this in turn is pivotable relative to the first element 1, the upper arm component 8 will be movable relative to the first element 1 with two degrees of freedom, namely pivotability about two axes.

It is preferred that the pivot axes 37 and 38 for the upper arm components 7, 8 of the link arrangements B, C intersect each other. Preferably, these pivot axes 37, 38 are perpendicular to each other.

It is pointed out that, in analogy to what is also described in the U.S. Pat. No. 4,976,582, an individual pair of links 14, 15; 16, 17; 18, 19 could be replaced by one individual link but this presupposes that the joint devices at the ends of this individual link, i.e. the hinged connection relative to the upper arm component of the link arrangement and the second element 2, are realised in the form of cardan joints.

The line 44 has, in FIG. 1, been placed on the frame part 32 and the line 42 on the frame part 33. However, this placement is arbitrary since the important thing is to have control over all degrees of freedom of the frame. The lines 44 and 42 may in principle be placed anywhere on an arbitrarily designed frame, as long as it is insured that the line 44 and the line 42 extend at an angle to each other. Likewise, the joint pairs 22/23 and 26/27 may be placed anywhere on the lines 44 and 42 respectively. Also as concerns the line 43 there are great possibilities for variation. Thus, the line 43 may be displaced in parallel arbitrarily in the frame. As already stated, the line 43 forms in the example a right angle to the line 44 whereas also the line 42 extends at a right angle relative to the line 44 and the line 43 forms an angle of substantially 450 relative to the line 42. However, these angle relations may be modified as indicated in FIG. 3. The presentation given therein illustrates that the lines 43 and 42 may be changed, the line 44 being considered, in this case, as a starting point. It is indicated in FIG. 3 with dashed lines that the lines 42 and 43 may be inclined considerably relative to the orientation illustrated in FIG. 1. However, it is emphasised that the lines 42 and 43 may not be directed so that all lines 42, 43 and 44 would be present in the same plane. The lines 42, 43 and 44 may neither be parallel.

The possibilities which within practical limits are possible as to the variation of the positions of the lines 42 and 43 according to what is indicated in FIG. 3 may be formulated in the following manner: planes, which are parallel to the pivoting centre line 44 for the joint arrangement 22, 23 between the links 14, 15 and the frame 2 of the link arrangement A and which besides are parallel to the pivoting centre line 43 for the joint arrangement 30, 31 between the links 18, 19 and the frame 2 of the link arrangement C form an angle which is different from 0° and 90°, suitably within 20–70°, preferably 30–60°, and specifically about 45° relative to the pivoting centre line 42 for the joint arrangement 26, 27 between the links 16, 17 and the frame 2 as concerns the link arrangement B. The latter pivoting centre line 42 then forms an angle which preferably is in the range from −30 to +60° relative to planes perpendicular to the pivoting centre line 44. For a good stability in this regard said angle of from −30 to +60° should be present as indicated in FIG. 3 with respect to the line 42, namely only in one direction counted from the starting position as it appears from FIG. 1.

As to the link arrangement C the pivoting centre line 43 for the joint arrangement 30, 31 forms angles which preferably are between −15 to +45° relative to planes perpendicular to the pivoting centre line 44 for the joint arrangement 22, 23 belonging to the link arrangement A.

It is pointed out that at all changes according to FIG. 3 of the direction of the lines 42 and 43 it is required that parallelism must be maintained relative to the lines 39 and 40 respectively as previously described. The orientation in the xy-plane of the frame, i.e. its angle $\phi_z$ of rotation about the z-axis,-is determined by the direction of the line 42 (in the xy-plane). Thus, the frame 2 in FIG. 1 will be rotated when the arm component 7 is turned around. In case a constant orientation is required, the arm component 7 may be replaced by a parallelogram, the extreme stay of which is connected to the arm part 12 and the inner stay of which is fixed to the stand 1. The drive means 4 is then arranged so that it puts the intermediate parallel stays in pivoting movement. Expressed in other words, this means that the arm component 7 in FIG. 1 would be replaced by two parallel stays included in a parallelogram.

It is evident that what has been described above is only to be considered as exemplifying for the inventive concept intended to be enlightened by the described embodiment. Numerous variations are realisable to the average men skilled in this art when knowledge has been gained with respect to the basic features of the invention. Thus, the inventive concept is only restricted by the enclosed claims, within which equivalent embodiments are included.

What is claimed is:

1. A device for relative movement of two elements comprising at least three link arrangements connected between the two elements and force applying arrangements for causing the link arrangements to move so as to provide the relative movement of the elements, each of the link arrangements comprising at least one first component and at least one second component, the first and second components in each of the link arrangements being hingedly interconnected and, in addition, hingedly connected to a respective associated of the first and second elements, the first and second components in each of the link arrangements being interconnected by means of joint arrangements, which allow, at least in the assembled state of the device, relative movement with two degrees of freedom between the respective first and second components, said degrees of freedom consisting of pivotability in all directions about two real or imaginary axes placed at an angle to each other, each of said at least one second component being connected to the second element by joint arrangements, which allow, in the assembled state of the device, relative mobility between the second components and the second element with two degrees of freedom in the form of pivotability in all directions about two real or imaginary axes placed at an angle relative to each other, the at least one second component in each of the link arrangements comprising at least two parallel links, which each is connected to the first component in the respective link arrangement and the second element by cardan joints or spherical joints or other joints allowing pivoting about two or three axes placed at an angle to each other, the joint arrangements connecting each individual of said second components to the first component in the respective link arrangement and to the second element forming real or imaginary pivot axes parallel to each other, wherein lines extending through pivoting centers formed by the joint arrangements between the at least one second component in the link arrangements and the second element do not all lie in the same plane, that for at least one of the link arrangements is the first component thereof pivotable relative to the first element about a pivot axis, which is substantially parallel to the pivoting center lines between the at least one second component in the link arrangement in question and the first component and the second element respectively, that the pivoting center lines for the link arrangements between the at least one second component in the link arrangements and the second element are non-parallel, that at least one of the link arrangements has its first component pivotable with one degree of freedom relative to the first element, that a second of the link arrangements has its first component pivotable about an axis relative to the first element and that this last mentioned axis forms the same angle relative to the pivoting center line for the link arrangement between the first and second components of the further link arrangement as the pivoting center lines between the at least one second component of the second link arrangement and the second element forms relative to the pivoting center lines between the at least one second component of the further link arrangement and the second elements.

2. A device according to claim 1, wherein the second of the link arrangements has its first component arranged to be connected with the first component of the further link arrangement to accompany this first component in a pivoting movement.

3. A device according to claim 2, wherein the second of the link arrangements has its first component pivotable about an axis relative to the first component of the further link arrangement.

4. A device according to claim 1 wherein it is formed by an industrial robot, the second element of which is adapted to carry, directly or indirectly, at least one working member.

5. A device according to that claim 1, wherein at least two of the link arrangements have their first component movable relative to the first element with one and not more than one degree of freedom.

6. A device according to claim 1, wherein at least one of the link arrangements has its first component movable relative to the first element with two and not more than two degrees of freedom.

7. A device according to claim 1, wherein at least one of the link arrangements has its first component pivotably arranged on the first component of another of the link arrangements about an axis.

8. A device according to claim 1, wherein the pivot axes for the first components of two of the link arrangements intersect each other.

9. A device according to claim 1, wherein the pivot axes for the first components of two of the link arrangements are substantially perpendicular to each other.

10. A device according to claim 1, wherein the force applying arrangement for bringing one of the link arrangements into movement has a first portion connected to the first element whereas this force applying arrangement has a second portion, which is movable relative to the first mentioned portion and which is arranged to cause the first component of the first mentioned of the link arrangements to move.

11. A device according to claim 1, wherein the force applying arrangement for causing one of the link arrangements to move has a first portion rigidly connected to the first element and a second portion, which is movable relative to the first and which is arranged to impart, by means of an angular gear, the first component of another of the link arrangements a pivoting movement.

12. A device according to claim 1, wherein the pivot axes for the first components of two of the link arrangements are substantially parallel.

13. A device according to claim 12, wherein the pivot axes for the first components of the two link arrangements coincide with each other.

14. A device according to claim 11, wherein the force applying arrangement acting, via the angular gear, on the first component of one of the link arrangements has its axis of rotation substantially parallel, and preferably substantially coinciding, with the axis of rotation of another force applying arrangement, which has a first portion rigidly connected to the first element and a second portion, which is movable relative to the first portion and connected to the first component of another of the link arrangements, more specifically the link arrangement, the movement of which the first component of the first mentioned link arrangement is arranged to accompany.

15. A device according to claim 1, wherein at least one of the link arrangements are the second components formed by at least two substantially parallel links.

16. A device according to claim 12, wherein each individual joint of the parallel links comprises two or three degrees of freedom considered on its own.

17. A device according to claim 1, wherein planes, which are parallel to the pivoting center line for the link arrangement between the at least one second component and the second element of one first of the link arrangements and which besides are parallel to the pivoting center line of the joint arrangement between the at least one second component and the second element of another of the link arrangements, form an angle which is different from 0° and 90°, suitably within 20–70°, preferably 30–60°, and specifically about 45°, relative to the pivoting center line of the joint arrangement between the at least one second component and the second element of a further of the link arrangements, and that the last mentioned pivoting center line forms an angle, which preferably is in the angle range from −30 to +60°, relative to planes perpendicular to the pivoting center line mentioned first in the present claim.

18. A device according to claim 17, wherein the pivoting center line of the joint arrangement between the at least one second component and the second element of another of the link arrangements forms angles which preferably are between −15 and +45° relative to planes perpendicular to the pivoting center line of the joint arrangement between the at least one second component and the second element of the one first of the link arrangements.

* * * * *